(12) United States Patent
Li et al.

(10) Patent No.: US 11,171,454 B2
(45) Date of Patent: Nov. 9, 2021

(54) USB CONNECTOR WITH DOUBLE SHIELD LAYERS

(71) Applicant: HUAWEI TECHNOLOGIES CO., LTD., Guangdong (CN)

(72) Inventors: Tongjie Li, Shenzhen (CN); Ke Ai, Shenzhen (CN); Bei Fu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 23 days.

(21) Appl. No.: 16/496,814

(22) PCT Filed: Nov. 27, 2017

(86) PCT No.: PCT/CN2017/113144
§ 371 (c)(1),
(2) Date: Sep. 23, 2019

(87) PCT Pub. No.: WO2018/171241
PCT Pub. Date: Sep. 27, 2018

(65) Prior Publication Data
US 2021/0104844 A1 Apr. 8, 2021

(30) Foreign Application Priority Data

Mar. 24, 2017 (CN) .......................... 201710182214.9
Oct. 9, 2017 (CN) .......................... 201710931237.5

(51) Int. Cl.
*H01R 13/6592* (2011.01)
*H01R 13/6598* (2011.01)
(Continued)

(52) U.S. Cl.
CPC ..... *H01R 13/6592* (2013.01); *H01R 13/6598* (2013.01); *H01R 13/6625* (2013.01); *H01R 31/06* (2013.01); *H02J 7/0042* (2013.01)

(58) Field of Classification Search
CPC .. H01R 13/6581–6598; H01R 13/6625; H01R 31/06; H02J 7/0042
(Continued)

(56) References Cited

U.S. PATENT DOCUMENTS 4,477,693 A 10/1984 Krabec et al.
5,221,216 A * 6/1993 Gabany ................. H01R 24/42
333/185
(Continued)

FOREIGN PATENT DOCUMENTS

CN 2577472 Y 10/2003
CN 201904509 U 7/2011
(Continued)

OTHER PUBLICATIONS

Extended (Supplementary) European Search Report dated Jan. 29, 2020, issued in counterpart EP Application No. 17901868.4. (10 pages).
(Continued)

*Primary Examiner* — Gary F Paumen
(74) *Attorney, Agent, or Firm* — Westerman, Hattori, Daniels & Adrian, LLP

(57) ABSTRACT

The present invention provides a method for designing USB floating with low electromagnetic interference, especially in a scenario in which a distance between a pin and a metal housing of a USB interface of a terminal device is increasingly small. A first plug and a second plug are connected by using a connection cable having a first shield layer and a second shield layer. The first shield layer and the second shield layer overlap and there is no electrical connection between the first shield layer and the second shield layer. One end of the first shield layer is connected to a metal housing of the first plug, and the other end is suspended. One end of the second shield layer is connected to a metal
(Continued)

housing of the second plug, and the other end is suspended. In addition, a metal housing of a first socket and a metal housing of a second socket may be connected to a housing of the terminal device or a housing of an adapter by using a capacitive component, thereby helping the terminal device reduce a short circuit risk and radiation.

17 Claims, 10 Drawing Sheets

(51) Int. Cl.
    *H01R 13/66*     (2006.01)
    *H01R 31/06*     (2006.01)
    *H02J 7/00*     (2006.01)

(58) Field of Classification Search
    USPC ........................................ 439/620.01–620.14
    See application file for complete search history.

(56) References Cited

U.S. PATENT DOCUMENTS

| | | | | |
|---|---|---|---|---|
| 5,563,559 | A * | 10/1996 | Stephens | H01R 13/7197 333/182 |
| 5,975,958 | A * | 11/1999 | Weidler | H01R 13/6625 439/620.22 |
| 7,794,277 | B1 * | 9/2010 | Peng | H01R 13/6582 439/607.01 |
| 7,927,147 | B1 * | 4/2011 | Shaw | H01R 13/719 439/620.13 |
| 8,562,376 | B2 * | 10/2013 | Chen | H01R 13/6625 439/607.24 |
| 9,728,304 | B2 * | 8/2017 | Visser | H01B 11/1008 |
| 10,020,095 | B1 * | 7/2018 | Huang | H01B 1/023 |
| 10,340,058 | B2 * | 7/2019 | Huang | H02G 11/00 |
| 2011/0115729 | A1 | 5/2011 | Kremin et al. | |
| 2013/0343248 | A1 | 12/2013 | Toner et al. | |
| 2015/0206625 | A1 | 7/2015 | Kumada | |
| 2016/0043511 | A1 | 2/2016 | Hsu | |

FOREIGN PATENT DOCUMENTS

| | | |
|---|---|---|
| CN | 103516482 A | 1/2014 |
| CN | 203596646 U | 5/2014 |
| CN | 104056796 A | 9/2014 |
| CN | 104685579 A | 6/2015 |
| CN | 104718510 A | 6/2015 |
| CN | 105471041 A | 4/2016 |
| CN | 105703181 A | 6/2016 |
| GB | 2020494 A | 11/1979 |
| JP | 229292 A | 1/1990 |
| JP | 8153545 A | 6/1996 |
| JP | 2016139295 A | 8/2016 |

OTHER PUBLICATIONS

Chen Jin-shun, "Approach on Noise Control and Signal-wires Connection of Broadcasting Equipment", Audio Engineering, dated 2007, total 5 pages with 2 pages English translation.

Jeff Erickson, "Improving performance, accuracy, and reliability in touch-screen based applications", retrieved from :http://embedded-computing.com/articles/improving-accuracy-reliability-touch-screen-based-applications/# on Dec. 21, 2019, total 7 pages.

International Search Report dated Feb. 14, 2018, issued in counterpart application No. PCT/CN2017/113144, with English translation.

Office Action dated Nov. 24, 2020, issued in counterpart JP Application No. 2019-522184, with English translation (10 pages).

\* cited by examiner

USB CONNECTOR WITH DOUBLE SHIELD LAYERS

PRIORITY CLAIMED

This application is a national stage of International Application No. PCT/CN2017/113144, filed on Nov. 27, 2017, which claims priority to Chinese Patent Application No. 201710182214.9, filed on Mar. 24, 2017 and Chinese Patent Application No. 201710931237.5, filed on Oct. 9, 2017. All of the aforementioned applications are hereby incorporated by reference in their entireties.

TECHNICAL FIELD

Embodiments of the present invention relate to the communications field, and in particular, to reduction of electromagnetic interference to a terminal device.

BACKGROUND

Continuous development of the semiconductor industry is accompanied with increasing reduction in a size of an electronic device, and therefore a consumer can enjoy a lighter and more appropriate electronic product. However, reduction in the size of the electronic device imposes an increasingly high requirement on stability of the electronic device and an ambient environment. A problem to be resolved is electromagnetic interference (EMI), and electromagnetic interference harms performance of a device, a transmission channel, or a system, and threatens both stability and security of a terminal device.

SUMMARY

According to one aspect, an embodiment of the present invention provides a universal serial bus (USB) connector, including: a first plug, where the first plug includes a first metal housing; a first socket, where the first socket includes the first metal housing, and the first socket is located in an enclosure of a terminal device; a second plug, where the second plug includes a second metal housing; and a second socket, where the second socket includes the second metal housing, and the second socket is located in an enclosure of an adapter, where the first plug is connected to the second plug by using a connection cable, the connection cable includes double layer shielded cables without electrical connection, the first metal housing of the first plug is connected to one end of a first-layer shielded cable, the other end of the first-layer shielded cable is suspended, the second metal housing of the second plug is connected to one end of a second-layer shielded cable, the other end of the second-layer shielded cable is suspended, and a capacitance between the first shield layer and the second shield layer is greater than a threshold. In this embodiment, multi-layer shielding can be implemented.

In a possible design, the threshold may be 0.5 pF. In this embodiment. EMI can be better reduced.

In a possible design, the first metal housing of the first socket is connected to an outer enclosure of the terminal device by using a capacitive component. In a possible design, the first metal housing of the first socket is connected to a ground cable by using a capacitive component. In a possible design, the capacitive component may be a capacitor or a transient voltage suppressor including a parasitic capacitor. In this embodiment, a metal housing can be prevented from being floating, and a high-frequency interference signal is filtered out.

In a possible design, the second metal housing of the second socket is connected to an outer enclosure of the adapter by using a capacitive component. In a possible design, the second metal housing of the second socket is connected to a ground terminal of the adapter by using a capacitive component. In some possible designs, the capacitive component may be a capacitor or a transient voltage suppressor including a parasitic capacitor. In this embodiment, a metal housing can be prevented from being floating, and a high-frequency interference signal is filtered out.

An embodiment of the present invention provides a USB connector, including: a first plug, where the first plug includes a first metal housing; a first socket, where the first socket includes the first metal housing, and the first socket is located in an enclosure of a terminal device; a second plug, where the second plug includes a second metal housing; and a second socket, where the second socket includes the second metal housing, and the second socket is located in an enclosure of an adapter; where the first plug is connected to the second plug by using a connection cable, the connection cable includes a shielded cable, the first metal housing of the first plug is connected to one end of the shielded cable, the second metal housing of the second plug is connected to the other end of the shielded cable, the first metal housing of the first socket is grounded by using a capacitor, and the second metal housing of the second socket is grounded by using a capacitor. In this embodiment, a metal housing can be prevented from being floating, and a high-frequency interference signal is filtered out.

An embodiment of the present invention provides a terminal device, including a USB socket, where the USB socket includes a metal housing, at least one metal pin, and at least one cavity and the metal housing of the USB socket is connected to an outer enclosure of the terminal device or a ground cable by using a capacitor.

An embodiment of the present invention provides a charging system, including: a terminal device and an adapter, where the charging system uses the USB connector described above. In this embodiment, EMI of the charging system can be reduced.

In a possible design, the adapter may be replaced with a computer system.

It should be noted that, in the embodiments of the present invention, different technical effects can be achieved through arbitrary combination.

According to the foregoing solutions, EMI of a system using the USB connector can be reduced in the embodiments of the present invention.

DESCRIPTION OF EMBODIMENTS

A "USB" in the present invention is a universal serial bus (USB for short), is a serial bus standard for connecting a computer system and an external device, and is also a technical specification of an input/output interface, widely applied to information communication products such as a personal computer and a mobile device, and extended to other related fields such as photographic equipment, a digital television (a set top box), and a game console.

"EMI" in the present invention is electromagnetic interference (EMI), and is specifically electronic noise that interferes with a cable signal and reduces signal integrity. Generally, an electromagnetic interference condition may include an electromagnetic interference source, for example, a microprocessor, a microcontroller, a transmission container, an electrostatic discharge execution element, or an instantaneous power execution element. The electromagnetic interference condition may further include a coupling path. Noise coupled to a circuit is most easily transferred by a conductor through which the noise passes. For example, electromagnetic wave radiation exists in each circuit. In this case, circuit coupling is formed. When a current changes, electromagnetic waves are generated. These electromagnetic waves may be coupled to a surrounding conductor and interfere with other signals in the circuit. The electromagnetic interference condition may further include a receiver. All electronic circuits may be subject to electromagnetic interference. Although some electromagnetic interference is directly accepted in a form of radio-frequency radiation, most electromagnetic interference is accepted through transient conduction. In a digital circuit, critical signals such as a reset signal, an interruption signal, and a control signal are most vulnerable to electromagnetic interference. A control circuit, an analog low-level amplifier, and a power adjustment circuit are also vulnerable to noise.

Figure 1:
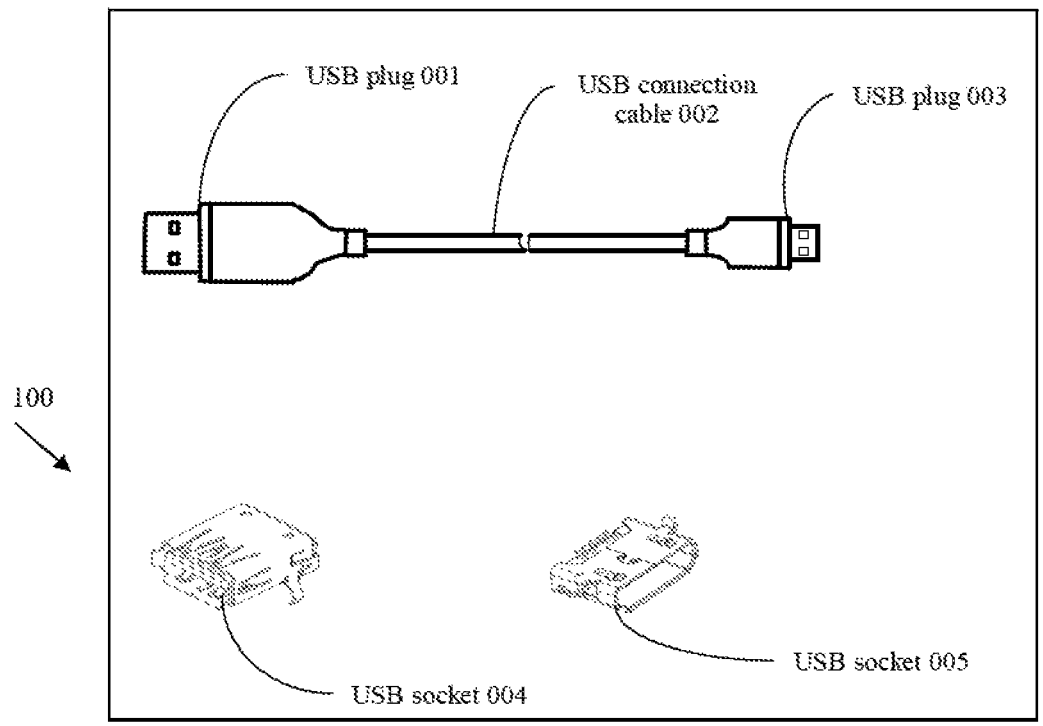
FIG. 1 is a first schematic diagram of a USB connector according to a possible implementation of the present invention.

FIG. 1 is a first schematic diagram of a USB connector 100 according to a possible implementation of the present invention.

In some embodiments, as shown in FIG. 1, the USB connector 100 includes a plug 001, a connection cable 002, a plug 003, a socket 004, and a socket 005. In some embodiments, the USB connection cable 002 is connected to the plug 001 and the plug 003. In some embodiments, the plug 001 and the plug 003 of the USB connector 100 may be combined at random. For example, the USB plug 001 and the plug 003 may include any one of typeA, typeB, miniA, miniB, microA, microB, USBtypeA, USBtypeB, USBmicroB, and typeC.

In some embodiments, the plugs of the USB connector 100 correspondingly match the sockets of the USB connector 100. For example, the plug 001 correspondingly matches the socket 004. Further, the socket 004 and the socket 005 may be corresponding sockets, for example, may be any one of typeA, typeB, miniA, miniB, microA, microB, USBtypeA, USBtypeB, USBmicroB, and typeC. In some embodiments, the plug 001 and the socket 004 of the USB connector 100 may be combined at random. For example, a socket microAB may be combined with the plug microA or the plug microB. In some embodiments, the USB connector 100 may use different versions, and a high version usually has downward compatibility. For example, a USB 3.2 may be compatible with a USB 3.1, a USB 3.0, a USB 2.0, a USB 1.1, and a USB 1.0.

Figure 2:
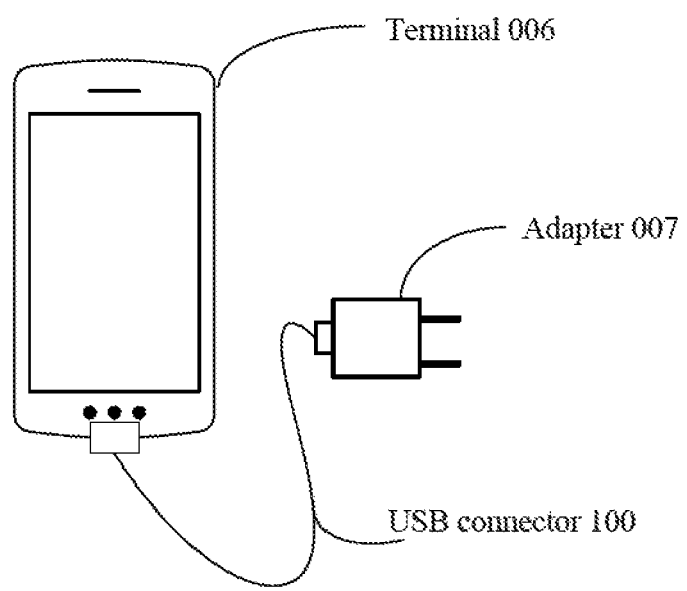
FIG. 2 is a schematic diagram of a charging system according to a possible implementation of the present invention.

FIG. 2 is a schematic diagram of a charging system according to a possible implementation of the present invention.

In some embodiments, as shown in FIG. 2, one end of a USB connector its connected to terminal device 006. Further, the terminal device 006 in this embodiment of the present invention may include a mobile phone, a tablet computer, a personal digital assistant (PDA), a point of sale (POS), an in-vehicle computer, a TV, a wearable device, an AR device, a VR device, a portable music player, and the like. In some embodiments, one end of the USB connector 100 may be further connected to a peripheral device. For example, the peripheral device may include any one or more of a keyboard, a mouse, a modem, a printer, a scanner, a digital camera, a game handle, a hard disk, a network component, and the like.

In some embodiments, as shown in FIG. 2, the other end of the USB connector 100 may be connected to an adapter 007, so as to supply power to the terminal device. Further, the socket 004 and the socket 005 are respectively located on the adapter and the terminal device 100. In some embodiments, the other end of the USB connector 100 may alternatively be a computer system. For example, the computer system may include any one of a desktop computer, a notebook computer, a host computer, a controller board, and the like. In some embodiments, both ends of the USB connector 100 may be connected to the terminal device. For example, the mobile phone is connected to the portable music player by using the USB connector 100.

FIG. 3 to FIG. 6 are a first schematic diagram to a fourth schematic diagram of a plug 001 of a USB connector 100 according to a possible implementation of the present invention.

Figure 3:
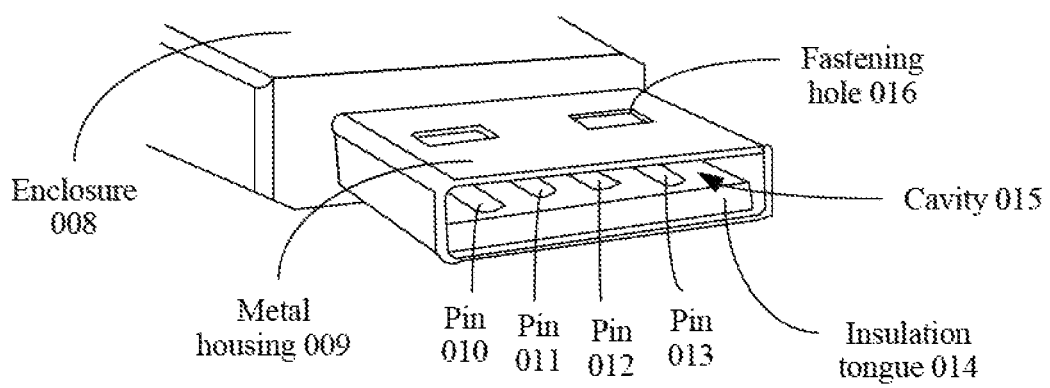
FIG. 3 is a first schematic diagram of a plug of a USB connector according to a possible implementation of the present invention.

In some embodiments, as shown in FIG. 3, the first schematic diagram of the plug 001 of the USB connector 100 is provided. The plug 001 includes an enclosure 008, a metal housing 009, a pin 010, a pin 011, a pin 012, a pin 013, an insulation tongue 014, a cavity 015, and a fastening hole 016. In some embodiments, the enclosure 008 may be an insulating plastic material. In some embodiments, at least one of the pin 010, the pin 011, the pin 012, and the pin 013 is a power-supply pin, for example, the pin 010. In some embodiments, at least one of the pin 010, the pin 011, the pin 012, and the pin 013 is a ground pin, for example, the pin 013. In some embodiments, at least one of the pin 010, the pin 011, the pin 012, and the pin 013 is a data transmission pin, for example, the pin 011. In some embodiments, the pin 010, the pin 011, the pin 012, and the pin 013 are attached to the insulation tongue 014. In some embodiments, the cavity 015 is formed between an upper surface of the insulation tongue 014 and an inner side of an upper surface of the metal housing 009.

Figure 4:
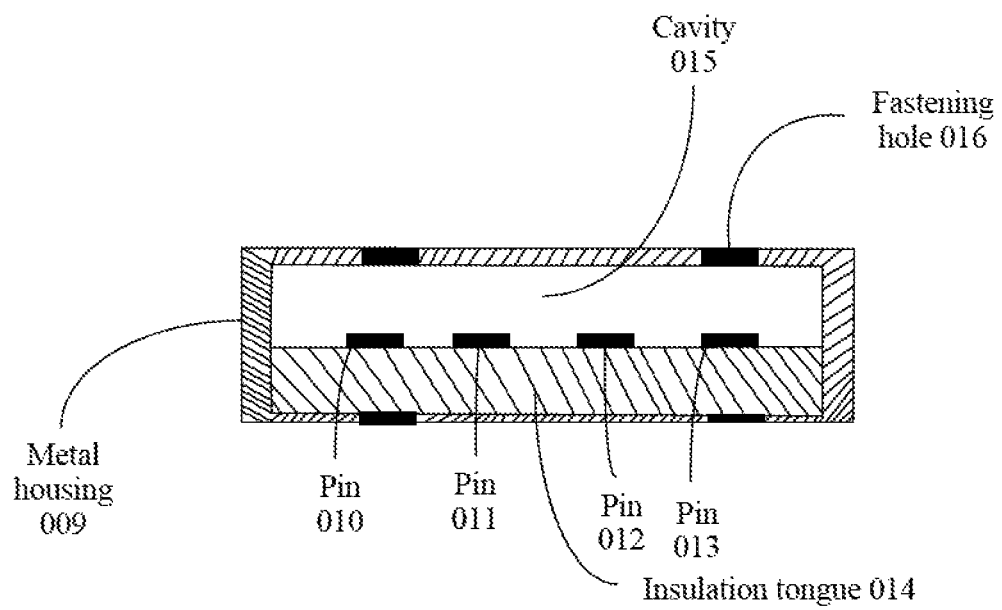
FIG. 4 is a second schematic diagram of a plug of a USB connector according to a possible implementation of the present invention.

In some embodiments, as shown in FIG. 4, a second schematic diagram of the plug 001 of the USB connector 100 is provided. The plug 001 includes a metal housing 009, a pin 010, a pin 011, a pin 012, a pin 013, an insulation tongue 014, a fastening hole 016, and a cavity 015.

Figure 5:
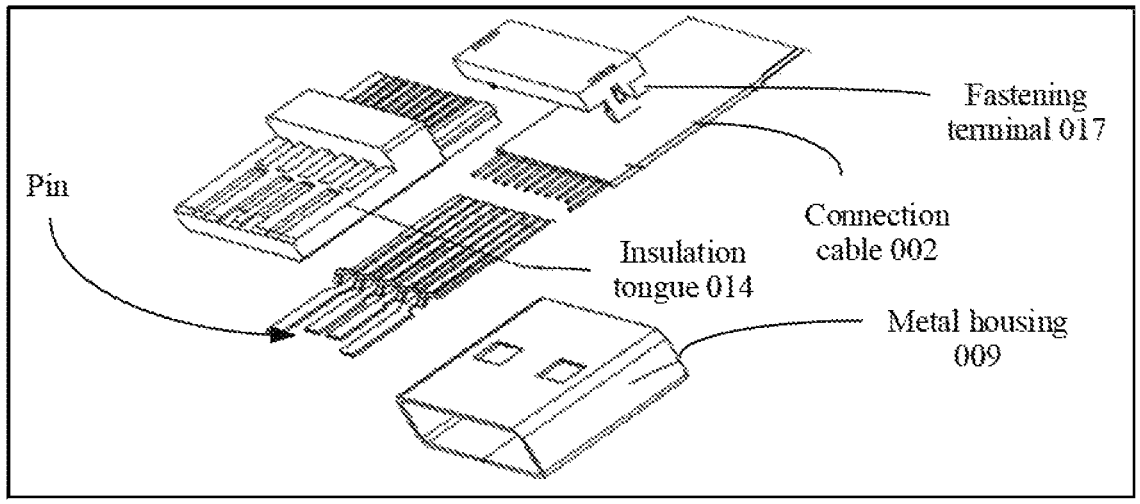
FIG. 5 is a third schematic diagram of a plug of a USB connector according to a possible implementation of the present invention.

In some embodiments, as shown in FIG. 5, a third schematic diagram of the plug 001 of the USB connector 100 is provided. The plug 001 includes a metal housing 009, a pin 010, a pin 011, a pin 012, a pin 013, an insulation tongue 014, a connection cable 002, and a fastening terminal 017.

Figure 6:
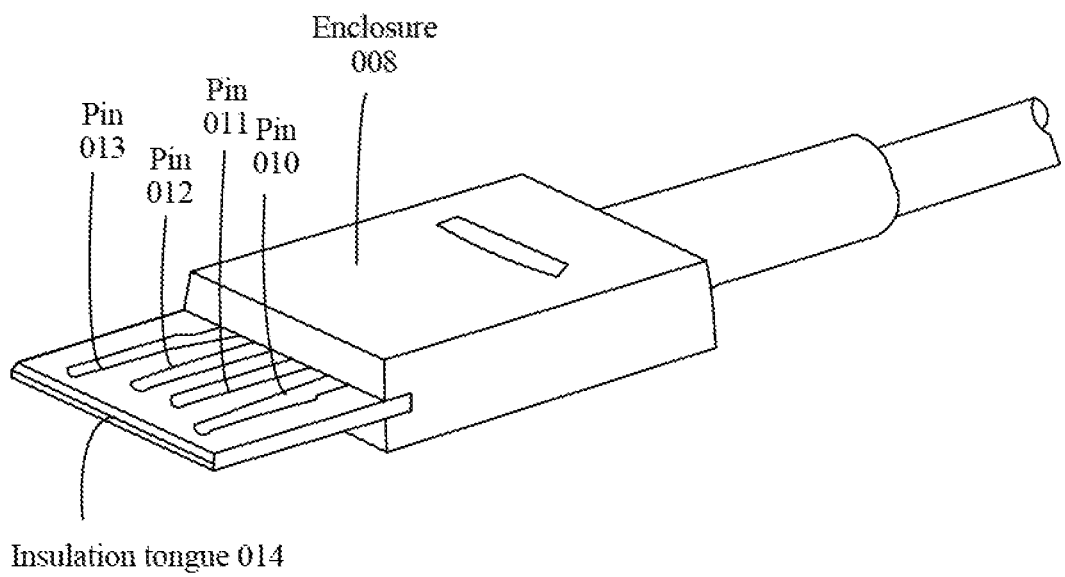
FIG. 6 is a fourth schematic diagram of a plug of a USB connector according to a possible implementation of the present invention.

In some embodiments, as shown in FIG. 6, the fourth schematic diagram of the plug 001 of the USB connector 100 is provided. The plug 001 includes a pin 010, a pin 011, a pin 012, a pin 013, an insulation tongue 014, and an enclosure 008.

Figure 7:
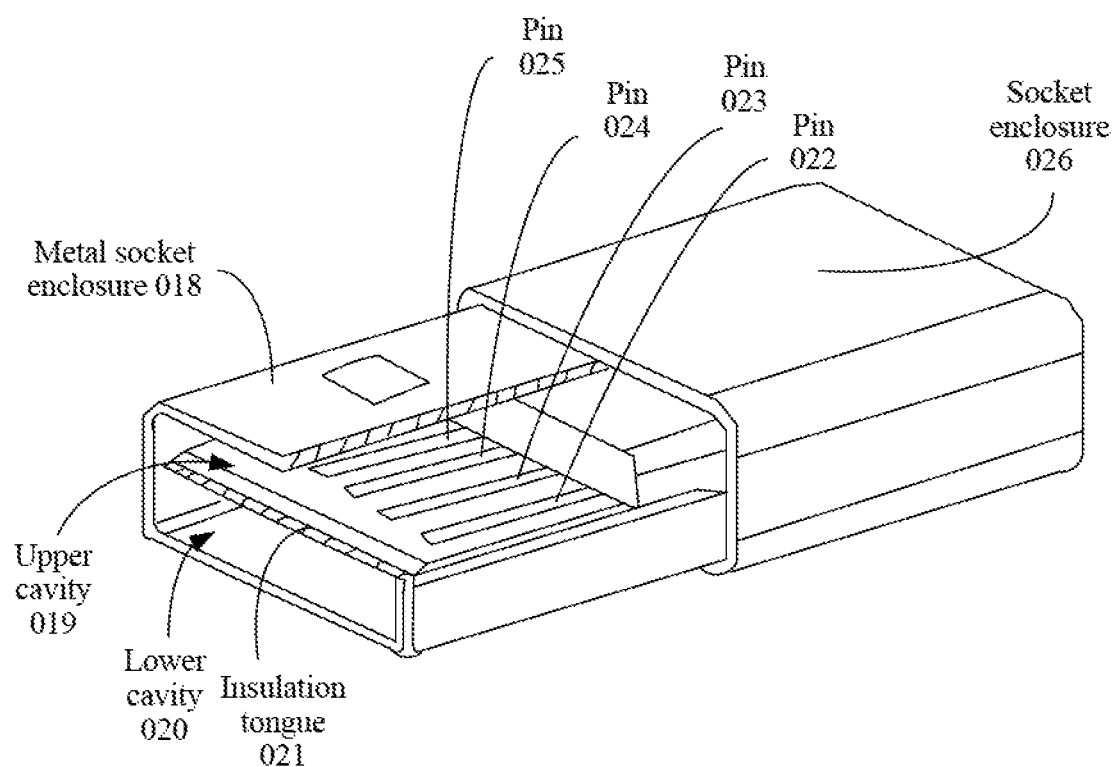
FIG. 7 is a schematic diagram of a socket of a USB connector according to a possible implementation of the present invention.

FIG. 7 is a schematic diagram of a socket 004 of a USB connector 100 according to a possible implementation of the present invention.

In some embodiments, as shown in FIG. 6, the schematic diagram of the socket 004 of the USB connector 100 is provided. The socket 004 includes a metal socket enclosure 018, an upper cavity 019, a lower cavity 020, an insulation tongue 021, a pin 022, a pin 023, a pin 024, a pin 025, and a socket enclosure 026. The pin 022, the pin 023, the pin 024, and the pin 025 are attached to an upper surface of the insulation tongue 021. The upper cavity 019 is formed between the upper surface of the insulation tongue 021 and an inside metal wall of an upper surface of the metal enclosure 018. The lower cavity 020 is formed between a lower surface of the insulation tongue 021 and an inside metal wall of a lower surface of the metal enclosure 018.

In some embodiments, when the socket 004 is connected to the plug 001, the insulation tongue 014 of the plug 001 is inserted into the upper cavity 019 of the socket 004. Further, the pin 010, the pin 011, the pin 012, and the pin 013 are respectively connected to the pin 022, the pin 023, the pin 024, and the pin 025 of the socket 004. For example, the pin 010 is connected to the pin 022. In some embodiments, when the socket 004 is connected to the plug 001, one side of the metal housing 009 of the plug 001 (for example, an upper surface facing the insulation tongue 014) is inserted into the lower cavity 020.

Figure 8:
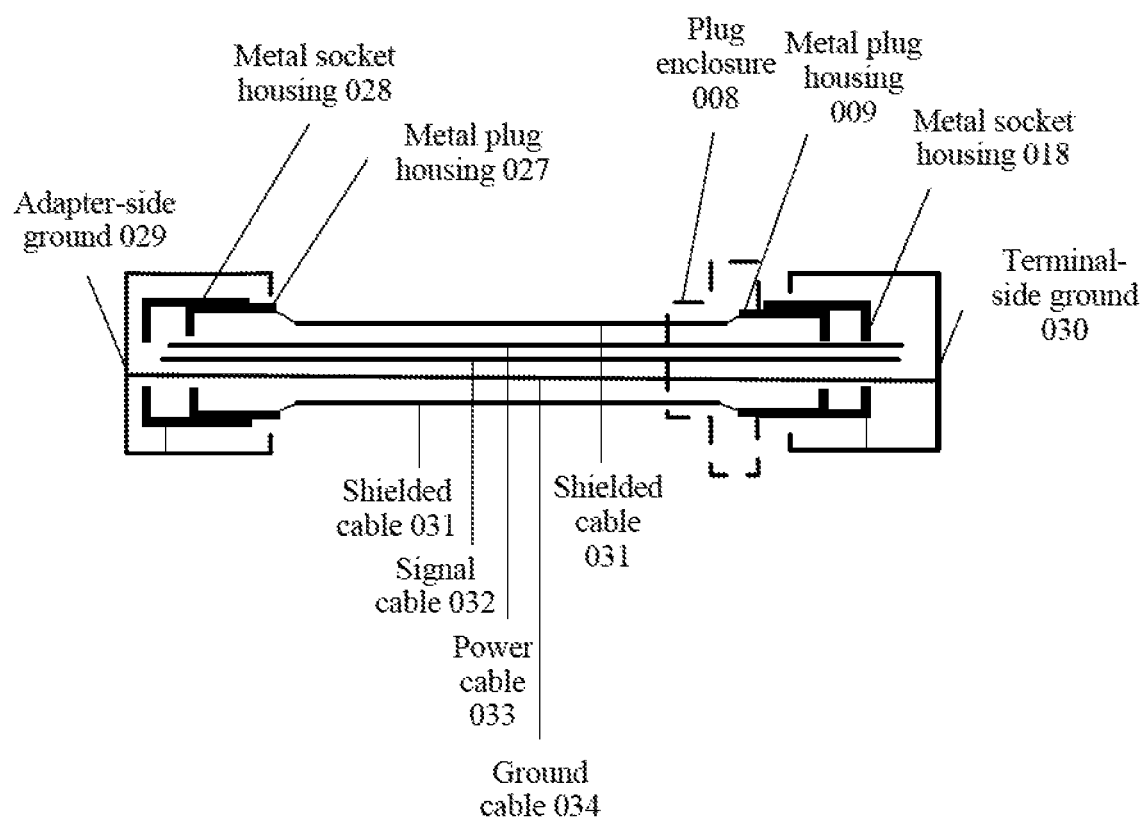
FIG. 8 is a second schematic diagram of a USB connector according to a possible implementation of the present invention.

FIG. 8 is a second schematic diagram of a USB connector 100 according to a possible implementation of the present invention.

In some embodiments, as shown in FIG. 8, when the plug 001 is connected to the socket 004 and the plug 002 is connected to the socket 005, for example, when the terminal device 006 is charged, the USB connector 100 is connected to the terminal device 006 and the adapter 007. In some embodiments, as shown in FIG. 8, a terminal-side ground 030, an adapter-side ground 029, and the metal housing 009 of the plug 001 are connected to the metal housing 018 of the socket 004, a metal housing 027 of the plug 003, a metal housing 028 of the socket 005, a shielded cable 031, and a ground cable 034. In some embodiments, a signal cable 032, a power cable 033, and the ground cable 034 may be connected to pins (as shown in FIG. 7). For example, the signal cable 032 may be connected to the pin 023 or the pin 024. In some embodiments, when the plug 001 is connected to the socket 004, the metal housing 018 of the socket 004 is connected to the metal housing 009 of the plug 001.

Figure 9:
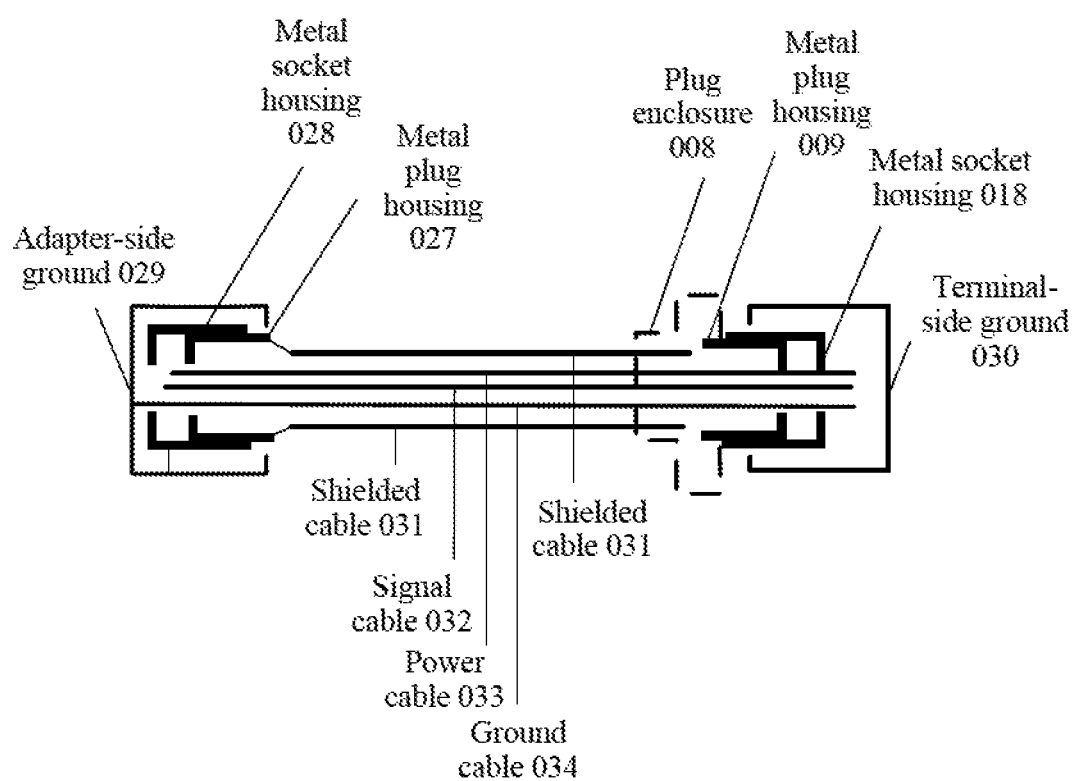
FIG. 9 is a third schematic diagram of a USB connector according to a possible implementation of the present invention.

FIG. 9 is a third schematic diagram of a USB connector 100 according to a possible implementation of the present invention.

Figure 10:
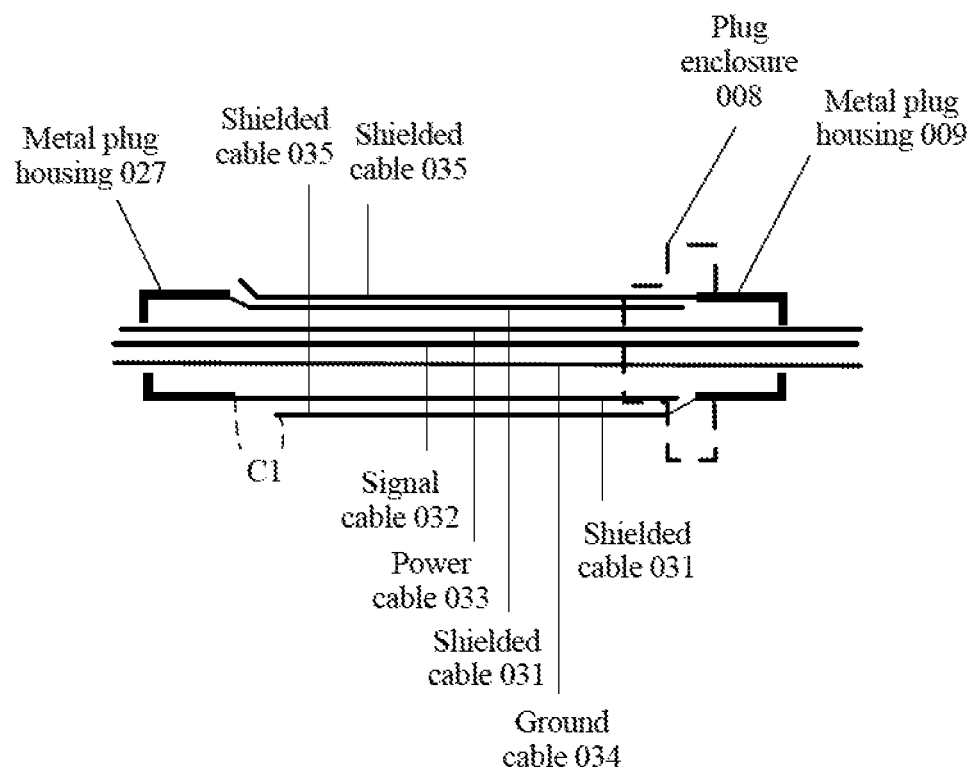
FIG. 10 is a fourth schematic diagram of a USB connector according to a possible implementation of the present invention.

In some embodiments, as shown in FIG. 10, a connection between the shielded cable 031 and the metal plug housing 009 on a terminal side is disconnected. For example, there may be no connection or the shielded cable 031 and the metal plug housing 009 may be connected by using an isolated electronic component. In some embodiments, a connection between the shielded cable 031 and the metal plug housing 027 on an adapter side is disconnected. For example, there may be no connection or the shielded cable 031 and the metal plug housing 027 may be connected by using an isolated electronic component. In some embodiments, the metal housing 009 of the plug 001 on the terminal side and the metal housing 018 of the socket 004 are not grounded, for example, may be floating or suspended.

In some embodiments, the metal plug housing 027 on the adapter side and the metal socket housing 028 may not be grounded, for example, may be floating or suspended.

Compared with the embodiment disclosed in FIG. 8, this embodiment has an advantage that an overheating problem caused by a half-short circuit can be resolved. For example, a spacing between the pin of the USB connector 100 and the metal housing 009 of the USB connector is increasingly small. Consequently, a half-short circuit is caused between a power supply and a GND after salt water or foreign matter enters and accumulates in a USB pot. Such a state may cause overheating during charging, and may even cause burning.

FIG. 10 is a fourth schematic diagram of a connector 100 according to a possible implementation of the present invention.

In some embodiments, as shown in FIG. 10, a shielded cable 035 is added outside the shielded cable 031. Further, the shielded cable 035 may be added inside the shielded cable 031. In some embodiments, one end of the shielded cable 035 is connected to the metal plug housing 009, and the other end of the shielded cable layer 035 is disconnected from the metal plug housing 029. In some embodiments, when one end of the shielded cable 031 is connected to the metal plug enclosure 009, the other end of the shielded cable 031 is disconnected from the metal plug housing 027. In some embodiments, the shielded cable 031 and the shielded cable 035 are in a disconnected state.

In some embodiments, the shielded cable 031 and the shielded cable 035 may be made from metal shielding materials such as aluminum, zinc, copper, iron, steel, nickel, and an alloy thereof. In some embodiments, the shielded cable 031 and the shielded cable 035 may be made from one or more of a conductive rubber, a metal woven mesh, a finger spring plate, and a plurality of conductive rubbers.

Figure 11:
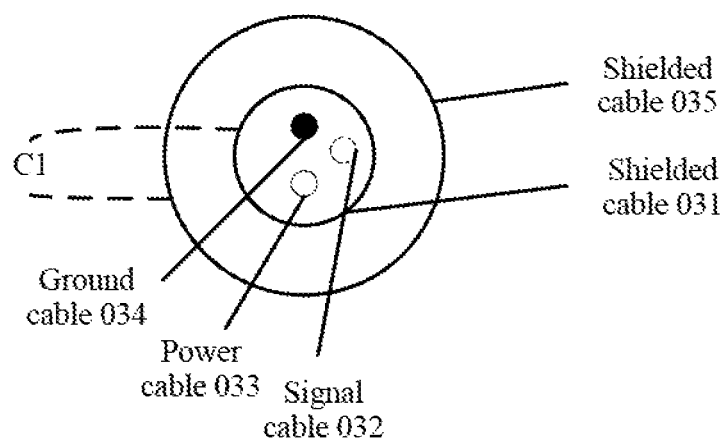
FIG. 11 is a fifth schematic diagram of a USB connector according to a possible implementation of the present invention.

As shown in FIG. 11, a fifth schematic diagram of the connector 100 is further provided according to the fourth schematic diagram of the connector 100 provided in FIG. 10. In some embodiments, the shielded cable 031 forms a shield layer 1, and the shielded cable 035 forms another shield layer 2. In some embodiments, a gap between the shielded cable 035 and the metal plug housing 027 may be considered as a capacitor C1. Further, air or an insulating material may be a medium. In some embodiments, the metal plug housing 027, the metal socket housing 028, and the shielded cable 031 are also connected. Further, the capacitor C1 may also be considered as a capacitor between the shielded cable 031 and the shielded cable 035 or between the shielded cable 035 and the metal socket housing 028. In some embodiments, the metal plug housing 009, the metal socket housing 018, and the shielded cable 035 are connected.

In some embodiments, the capacitor C1 is formed between the shielded cable 031 and the shielded cable 035. In some embodiments, the C1 may be considered as a deformed parallel-plate capacitor, and a capacitance of the C1 may be estimated according to $C=\varepsilon s/4\pi kd$. For example, the capacitance may be adjusted by adjusting a distance between shielded cables. In some embodiments, the capacitance of the capacitor C1 or a capacitor C2 directly affects high-frequency loop impedance. For example, a formula for calculating loop impedance Z is: $1/j2\pi fc$, where f is frequency, and C is capacitance. In some embodiments, if C=0.5 pF, when f=1 GHz, 10 GHz, or 100 GHz, Z=320 ohm (ohm), 32 ohm, or 3.2 ohm. It can be learned that, in a high-frequency state, a larger capacitance indicates lower current return impedance and a better current return effect.

In this embodiment, electromagnetic interference is reduced by using a double-layer shielding technology, thereby effectively suppressing a noise current caused by electromagnetic wave radiation and conduction and a high-order harmonic wave.

In some embodiments, a high-frequency loop current may form a return current by using the capacitor C1, to form a similar state in which two ends are grounded, so as to implement magnetic field shielding, thereby suppressing EMI in a high-frequency magnetic field. In addition, for an electromagnetic wave, although this shield layer is incomplete, a gap between two shield layers is relatively small, so that the electromagnetic wave is shielded to some extent, thereby suppressing EMI.

In comparison with the embodiment disclosed in FIG. 9, in the present invention, the shield layer is added to suppress EMI in the high-frequency magnetic field.

Figure 12:
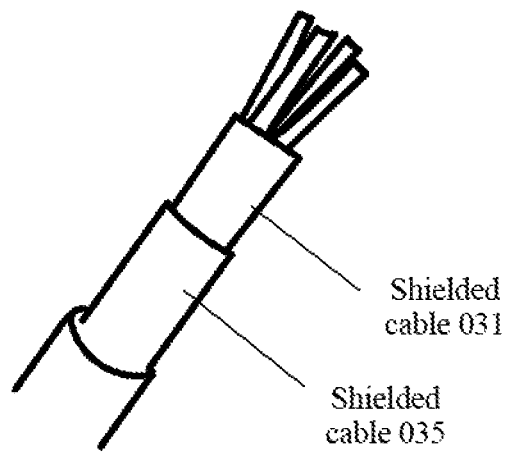
FIG. 12 is a sixth schematic diagram of a USB connector according to a possible implementation of the present invention.

FIG. 12 is a sixth schematic diagram of a connector 100 according to the present invention.

As shown in FIG. 12, in some embodiments, the shielded cable 035 is located at an outer layer of the shielded cable 031. Further, there is no connection between the shielded cable 031 and the shielded cable 035.

Figure 13:
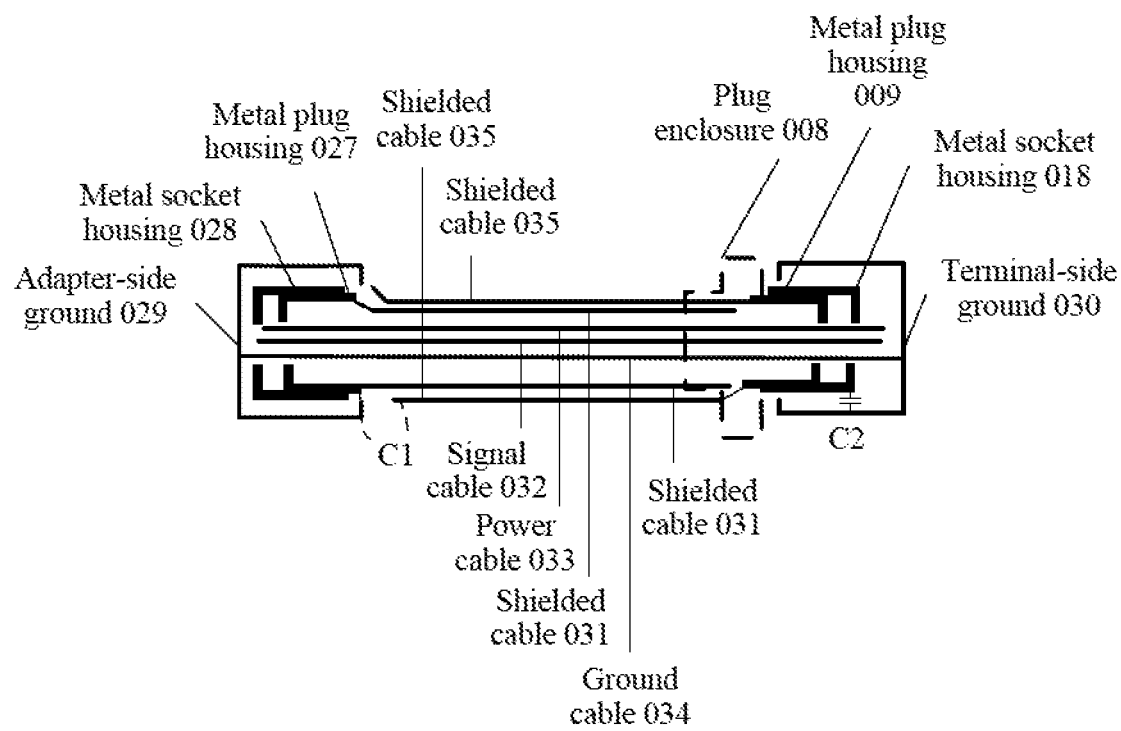
FIG. 13 is a seventh schematic diagram of a USB connector according to a possible implementation of the present invention.

FIG. 13 is a seventh schematic diagram of a connector 100 according to a possible implementation of the present invention.

In some embodiments, as shown in FIG. 13, the metal socket housing 018 is grounded by using several capacitive components (for example, the capacitor C2). For example, the capacitive component may be a capacitor or a transient voltage suppressor including a parasitic capacitor.

In some embodiments, when the USB connector 100 is in a working state, to be specific, when the metal plug housing 009 is connected to the metal socket housing 018, it may be considered that the metal plug housing 009 and the metal socket housing 018 are grounded by using a capacitor (for example, the metal plug housing 009 and the metal socket housing 018 are connected to the terminal-side ground 030).

In some embodiments, the capacitor C2 may be a decoupling capacitor. For example, high-frequency signal interference is removed. Further, interference may be caused by electromagnetic radiation.

In some embodiments, the capacitor C2 is added to prevent the metal socket housing 018 and the metal plug housing 009 from being floating, and an EMI problem caused because a shielded cable layer has an aperture can be resolved. In some embodiments, for the terminal device 006, when the metal socket housing 018 is floating and a shield layer is incomplete, the EMI problem may be caused. Consequently, radiation of the terminal device 006 is too large to satisfy a security standard. However, the foregoing problem can be resolved in this embodiment.

Figure 14:
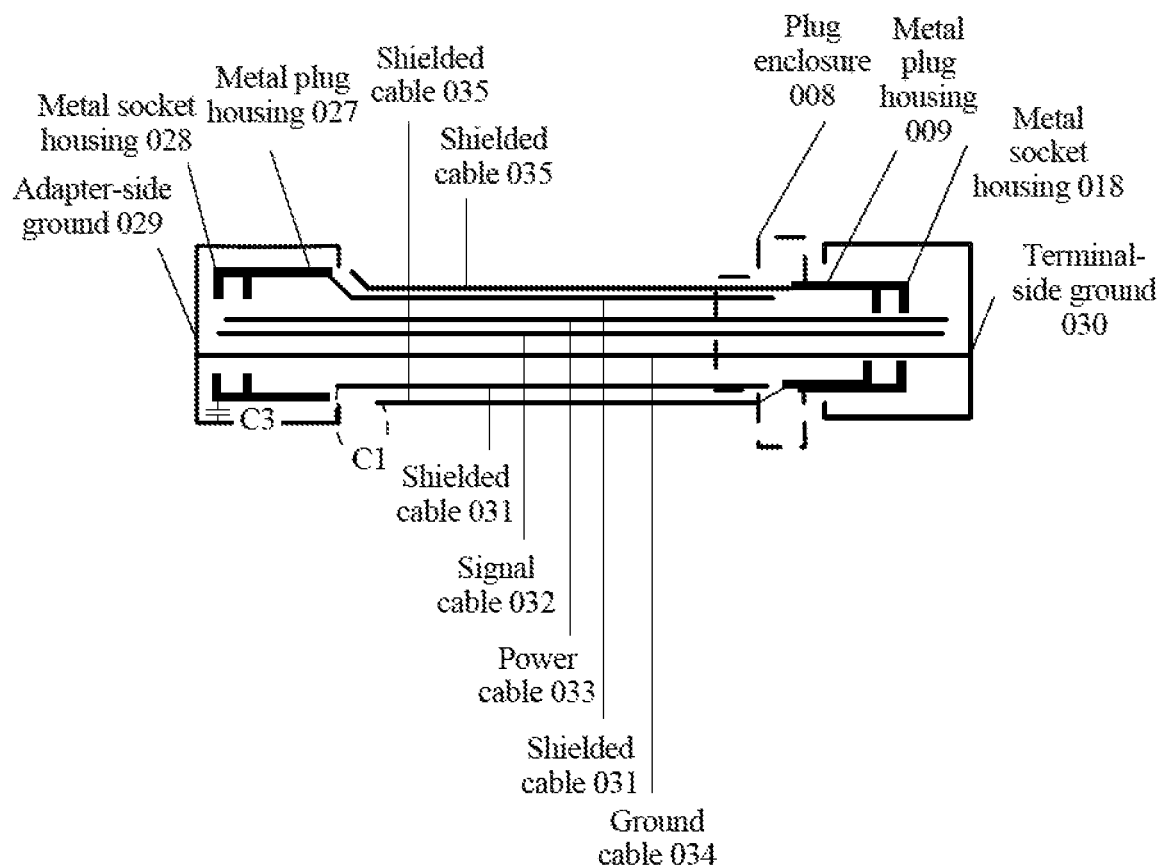
FIG. 14 is an eighth schematic diagram of a USB connector according to a possible implementation of the present invention.

FIG. 14 is an eighth schematic diagram of a connector 100 according to a possible implementation of the present invention.

In some embodiments, as shown in FIG. 14, the metal socket housing 028 is grounded by using several capacitive components (for example, may be a capacitor C3). Further, the capacitive component may be a capacitor or a transient voltage suppressor including a parasitic capacitor.

In some embodiments, the capacitor C3 may be a decoupling capacitor. For example, high-frequency signal interference is removed. Further, interference may be caused by electromagnetic radiation.

In some embodiments, when the USB connector 100 is in a working state, to be specific, when the metal plug housing 027 is connected to the metal socket housing 028, it may be considered that the metal plug housing 027 and the metal socket housing 028 are grounded by using a capacitor (for example, the metal plug housing 027 and the metal socket housing 028 are connected to the adapter-side ground 029).

In this embodiment, the capacitor C3 is added to prevent the metal socket housing 027 and the metal plug housing 028 from being floating, and EMI that may be caused because a shielded cable layer has an aperture can be reduced. In some embodiments, for the terminal device 006, when the metal socket housing 018 is floating and a shield layer is incomplete, an EMI problem may be caused. Consequently, radiation of the terminal device 006 is too large to satisfy a security standard. However, EMI can be reduced in this embodiment.

Figure 15:
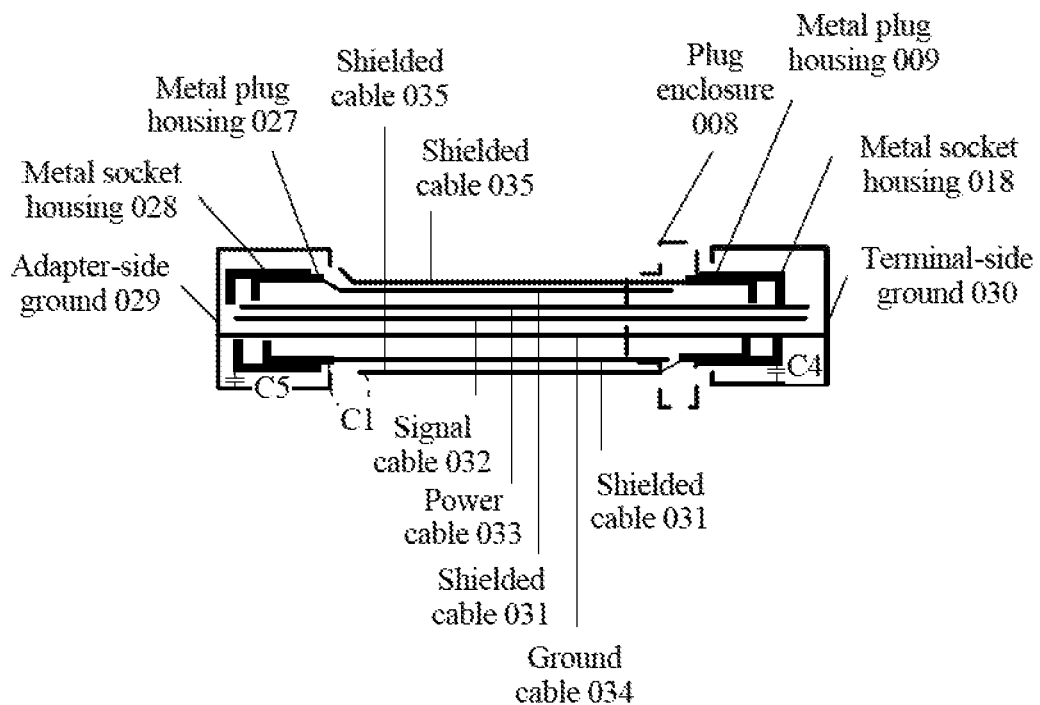
FIG. 15 is a ninth schematic diagram of a USB connector according to a possible implementation of the present invention.

FIG. 15 is a ninth schematic diagram of a connector 100 according to a possible implementation of the present invention.

As shown in FIG. 15, the metal socket housing 018 is grounded by using several capacitive components (for example, a capacitor C4), and the metal socket housing 028 is grounded by using several capacitive components (for example, a capacitor C5).

In this embodiment, capacitive components are added to the metal socket housing 018 on the terminal side and the metal socket housing 028 on the adapter side for grounding, so that an entire USB connection system has no floating component, and there is no obvious aperture at a shield layer. According to the method in this embodiment, system EMI is greatly reduced, and a filtering component optimizing solution that increases excessive costs is not required.

Figure 16:
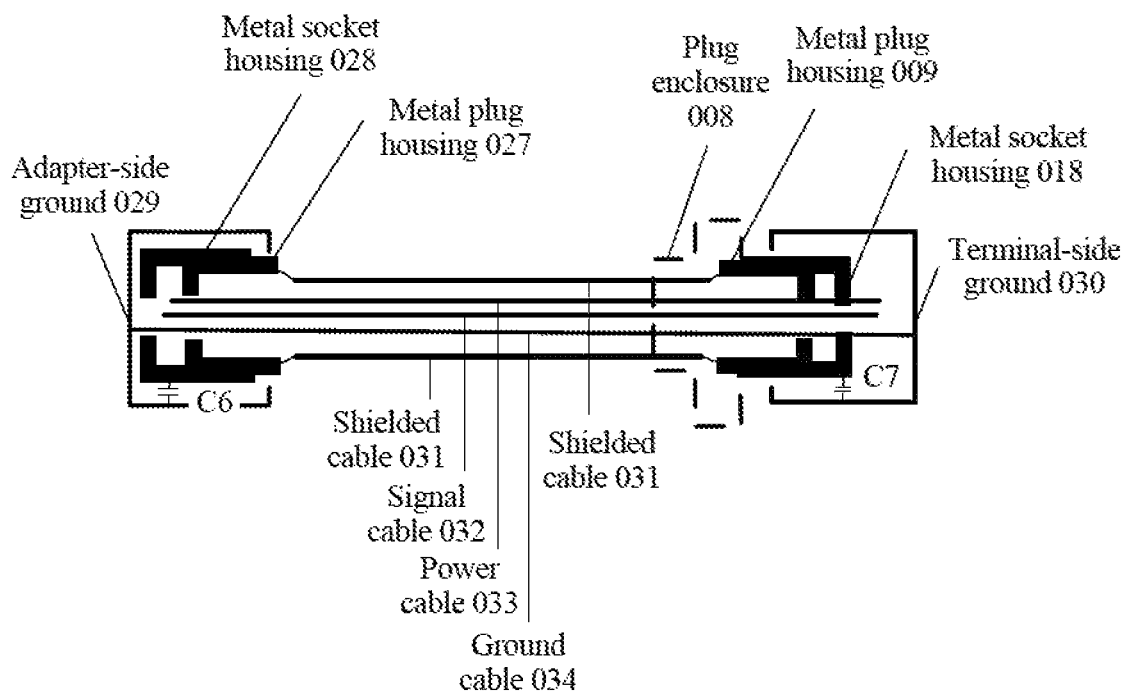
FIG. 16 is a tenth schematic diagram of a USB connector according to a possible implementation of the present invention.

FIG. 16 is a tenth schematic diagram of a connector 100 according to a possible implementation of the present invention.

As shown in FIG. 16, in the embodiment shown in FIG. 8, in some embodiments, the metal socket housing 028 is connected by using several capacitive components (for example, a capacitor C6), and the metal socket housing 018 is connected by using several capacitive components (for example, a capacitor C7). In some embodiments, both ends of the shielded cable 031 are respectively connected to the metal plug housing 009 and the metal plug housing 027.

In the connection method described in this implementation, a solution of adding a shielded cable layer is not used. Based on the schematic diagram shown in FIG. 8, in this embodiment, the capacitor C7 is added to prevent the metal socket housing 018 and the metal plug housing 009 from being floating, and the capacitor C6 is added to prevent the metal socket housing 027 and the metal plug housing 028 from being floating. In addition, in this solution, a shield layer is complete, so that EMI of an entire system can be reduced.

It should be noted that "plug" and "socket" in the present invention are not intended to limit the present invention, but for ease of description. In some embodiments, they may be interchanged or replaced. The "connection" and "disconnected", "disconnected state", and "disconnected" in the present invention may be an electrical connection or electrical disconnection.

A possible implementation of the present invention provides a low-EMI charging system. As shown in FIG. 2, the system includes at least one terminal device 006, at least one USB connector 100, and at least one adapter 007.

In some embodiments, the charging system may alternatively be a data transmission system. For example, the adapter 007 may be replaced with a computer system or the like.

In some embodiments, the charging system uses a connection manner of any circuit or several circuits described in FIG. 8 to FIG. 16.

A possible implementation of the present invention further provides a low-radiation terminal device 006. Capacitance grounding is mainly performed on a metal iron shell of a charging interface (for example, may be a typeC interface), so as to reduce electromagnetic interference during charging, thereby reducing device radiation.

Implementations of the present invention may be combined at random to implement different technical effects.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used in the present invention includes a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In conclusion, what are described above are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A USB connector, comprising:
a first plug having a first metal housing; and
a second plug having a third metal housing, wherein
the first plug is connected to the second plug by a connection cable,
the connection cable comprises a first shield layer and a second shield layer,
the first shield layer and the second shield layer overlap, with no electrical connection between the first shield layer and the second shield layer,
the first metal housing of the first plug is connected to one end of the first shield layer,
the other end of the first shield layer is suspended,
the third metal housing of the second plug is connected to one end of the second shield layer,
the other end of the second shield layer is suspended, and
a capacitance between the first shield layer and the second shield layer is greater than a threshold.

2. The USB connector according to claim 1, wherein the threshold is 0.5 pF.

3. The USB connector according to claim 1, wherein the first shield layer and the second shield layer are made from one or more of aluminum, zinc, copper, iron, steel, nickel, and an alloy thereof.

4. The USB connector according to claim 1, further comprising a first socket, wherein the first socket comprises a second metal housing, the first socket is located in an enclosure of a terminal device, the first plug is used for the first socket, and the second metal housing of the first socket is connected to the enclosure of the terminal device by a capacitive component.

5. The USB connector according to claim 4, wherein the capacitive component is either of or both a capacitor and a transient voltage suppressor comprising a parasitic capacitor.

6. The USB connector according to claim 1, further comprising a second socket, wherein
the second socket comprises a fourth metal housing,
the second socket is located in an enclosure of an adapter, the second plug is used for the second socket, and
the fourth metal housing of the second socket is connected to the enclosure of the adapter by a capacitor.

7. A USB connector, comprising:
a first plug, wherein the first plug comprises a first metal housing;
a first socket, wherein the first socket comprises a second metal housing, and the first socket is configured to be located in an enclosure of a terminal device;

a second plug, wherein the second plug comprises a third metal housing; and a second socket, wherein the second socket comprises a fourth metal housing, and the second socket is configured to be located in an enclosure of an adapter, wherein the first plug is used for the first socket, the second plug is used for the second socket, the first plug is connected to the second plug by a connection cable, the connection cable comprises a shield layer, the first metal housing of the first plug is connected to one end of the shield layer, the third metal housing of the second plug is connected to the other end of the shield layer, the second metal housing of the first socket is connected to the enclosure of the terminal device by a first capacitive component, and the fourth metal housing of the second socket is connected to the enclosure of the adapter by using a second capacitive component.

8. The USB connector according to claim 7, wherein each of the first capacitive component and the second capacitive component is either of or both a capacitor and a transient voltage suppressor comprising a parasitic capacitor.

9. The USB connector according to claim 7, wherein a capacitance of the first capacitive component or the second capacitive component is 0.5 pF.

10. The USB connector according to claim 7, wherein the shield layer is made from one or more of aluminum, zinc, copper, iron, steel, nickel, and an alloy thereof.

11. A charging system, comprising:
a terminal device; and
an adapter,
wherein the charging system uses a USB connector for charging, the USB connector comprising:
a first plug having a first metal housing;
a first socket having a second metal housing, the first socket being located in an enclosure of the terminal device;
a second plug having a third metal housing; and
a second socket having a fourth metal housing, the second socket being located in an enclosure of the adapter, and wherein the first plug is used for the first socket, the second plug is used for the second socket, the first plug is connected to the second plug by a connection cable, the connection cable comprises a first shield layer and a second shield layer, the first shield layer and the second shield layer overlap and there is no electrical connection between the first shield layer and the second shield layer, the first metal housing of the first plug is connected to one end of the first shield layer, the other end of the shield layer is suspended, the third metal housing of the second plug is connected to one end of the second shield layer, the other end of the second shield layer is suspended, and a capacitance between the first shield layer and the second shield layer is greater than a threshold.

12. The charging system according to claim 11, wherein the threshold is 0.5 pF.

13. The charging system according to claim 11, wherein the first shield layer and the second shield layer are made from one or more of aluminum, zinc, copper, iron, steel, nickel, and an alloy thereof.

14. The charging system according to claim 11, wherein the second metal housing of the first socket is connected to the enclosure of the terminal by a capacitive component.

15. The charging system according to claim 11, wherein the fourth metal housing of the second socket is connected to the enclosure of the adapter by a capacitive component.

16. The charging system according to claim 14, wherein the capacitive component is either of or both a capacitor and a transient voltage suppressor comprising a parasitic capacitor.

17. The charging system according to claim 15, wherein the capacitive component is either of or both a capacitor and a transient voltage suppressor comprising a parasitic capacitor.

* * * * *